K. SCHWARZ.
LUBRICATING DEVICE.
APPLICATION FILED MAY 17, 1911.
1,039,448.
Patented Sept. 24, 1912.
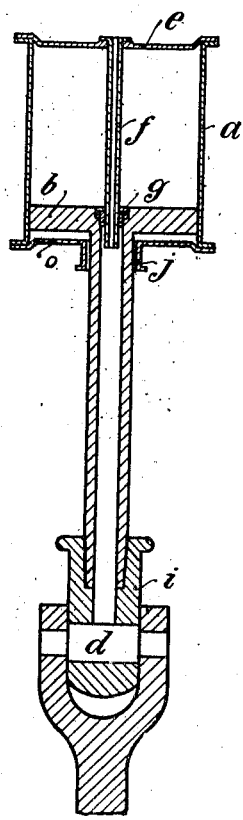
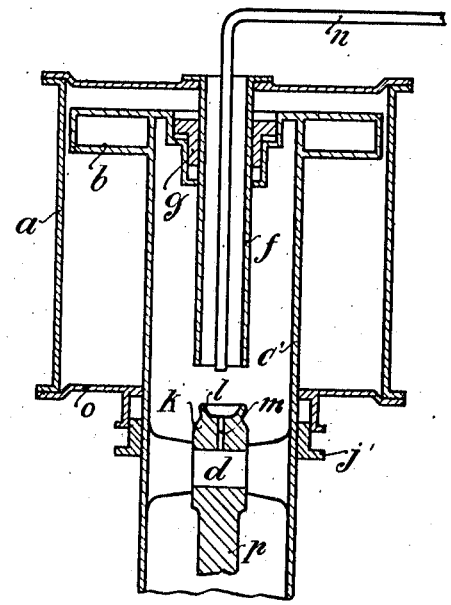

UNITED STATES PATENT OFFICE.

KARL SCHWARZ, OF NUREMBERG, GERMANY.

LUBRICATING DEVICE.

1,039,448.   Specification of Letters Patent.   Patented Sept. 24, 1912.

Application filed May 17, 1911. Serial No. 627,741.

*To all whom it may concern:*

Be it known that I, KARL SCHWARZ, a citizen of the Empire of Germany, residing at Nuremberg, in the Empire of Germany, have invented a new and useful Lubricating Device, of which the following is a specification.

In vertical cylinder-engines of a considerable height the lubrication of the cross-head-pin presents great difficulties, more particularly in engines running at a high speed, for the reason, that the lubricating material is obliged to pass through rapidly moving machine parts, in which great centrifugal forces and moments of inertia are generated. In order to overcome the effects of these forces and moments and to attain a reliable lubrication the oil is frequently supplied under a high pressure of up to several atmospheres, so that in consequence of this the oil is forced out in a thin layer from the surfaces to be lubricated resulting in a great waste of oil and in soiling the machine parts.

My invention relates to improvements in lubricating devices of the said kind, whereby the said difficulties are avoided. The oil is conducted to the crosshead-pin from above, so that it is rendered unnecessary to supply the lubricating material under pressure. For this purpose a vertical central tube is fastened in the top of the cylinder and is made so long, that even for the lowest position of the piston it still extends into the piston. This constitutes one feature of my invention.

A second improvement consists in tightening the tube in the piston by means of a stuffing-box, so as to prevent the medium under pressure in the cylinder from escaping.

Other improvements will be hereinafter described.

I will now proceed to describe my invention with reference to the accompanying drawing, in which—

Figure 1 is a vertical longitudinal section through a cylinder with an ordinary piston, and Fig. 2 is a vertical longitudinal section through a cylinder with a differential piston.

In a vertical cylinder-engine with an ordinary piston *b*, such as is for example illustrated at Fig. 1, I fasten a central tube *f* in the upper cover *e* of the cylinder *a* and extend it through the piston. It is then necessary to tighten the tube *f* in the piston *b* by means of a stuffing-box *g* of any known construction. The piston rod *c* passing through a stuffing-box *j* in the bottom of the cylinder *o* is in conjunction with the cross-head *i* made hollow according to my invention, so that a central channel *h* extending from the stuffing-box *g* to the crosshead-pin *d* is formed. The cylinder *a* with the two covers *e* and *o*, the stuffing-boxes *g* and *j* and the crosshead *i* are only diagrammatically shown, as their construction is immaterial to my invention. A lubricator (not shown) of any known construction is to be connected with the upper end of the tube *f*, so that the oil can pass from the lubricator through the tube *f* and the channel *h* to the crosshead-pin *d* and lubricate it. Evidently it is easy to also lubricate the crank-pin from the crosshead *i* in any known manner, but I do not further describe it here.

Fig. 2 illustrates a vertical cylinder *a'* with a differential piston *b' c'*, in which case the lubricating device according to my invention is slightly modified, as follows. A separate tube *n* disposed in the central line of the central tube *f'* serves for replacing the channel *h* in Fig. 1 and extends downward about as far as the tube *f'*. The head *k* of the connecting rod *p* is provided with a cup *l*, which is adapted to catch the oil dripping from the tube *n* (the latter being of course connected with the respective lubricator) and to lead it through the bore *m* to the crosshead-pin *d'*. The tube *n* need not be tightened, since the cylinder *a'* is tightened above the piston *b'* by the stuffing-box *g'* and beneath the piston by the other stuffing-box *j'*. Of course the tube *f'* need not be so wide, as is shown at Fig. 2. If it is made narrow, it may be connected at its upper end directly to the tube *n* so that its lower end can properly conduct the oil into the cup *l*. In case the cylinder is provided with a trunk, that is a hollow piston similar to *c'* in Fig. 2, but without the disk *b'*, of course the lubricating device described may be the same as before.

The lubricating device described is particularly useful for vertical cylinder-engines, which do not develop a great heat, such as pumps and blast-engines.

I claim:

1. In a vertical cylinder-engine, in combination, a cylinder with a conduit for the lubricant passing centrally through same and secured in its top cover, and a stuffing box in the center of its bottom cover, a reciprocating piston in the cylinder with a stuffing box in its center adapted to slide on the conduit for the lubricant, a hollow piston rod sliding in the stuffing box of the cylinder and being in constant communication with the lubricant conduit, and a crosshead on the bottom end portion of the hollow piston rod having a crosshead pin and a channel that coincides with the bore of the piston rod, and leads to said crosshead pin.

2. In a vertical cylinder-engine, in combination, a cylinder with a central tube secured in its top cover and a stuffing box in its bottom cover, a conduit for the lubricant passing through the central tube of the cylinder, a hollow piston reciprocating in the cylinder and sliding in its stuffing box, a stuffing box in the top of the hollow piston sliding on the central tube of the cylinder, a crosshead with a pin, a cup in the top of said head and a bore through same connecting with said cup and leading to said crosshead pin, and a connecting rod for the crosshead adapted to rock on the crosshead pin.

3. In a vertical cylinder-engine having a cylinder with reciprocating piston and a crosshead with crosshead pin, a lubricating device adapted to lubricate the crosshead pin from above without pressure comprising essentially a conduit for the lubricant passing vertically through the cylinder in its center, and intermediary means for establishing communication between said conduit for the lubricant and the crosshead pin.

KARL SCHWARZ.

Witnesses:
   JOH. SPANNER,
   RALPH W. DOX.